Aug. 27, 1963   H. M. HARMER   3,102,059
CATALYTIC DEVICES FOR ELECTRIC ACCUMULATORS
Filed Feb. 20, 1961

INVENTOR
HAROLD MARTIN HARMER

By Shoemaker and Mattare
ATTORNEYS 3,102,059
CATALYTIC DEVICE FOR ELECTRIC ACCUMULATORS
Harold Martin Harmer, Brentwood, Essex, England, assignor to Miranda Corporation, New York, N.Y., a corporation of New Mexico
Filed Feb. 20, 1961, Ser. No. 90,275
9 Claims. (Cl. 136—181)

This invention concerns improvements relating to catalytic devices for causing the re-combination of hydrogen and oxygen evolved from an accumulator cell and returning the water so formed to the electrolyte in the cell. Such a device is described, for example, in the Specification of British Patent No.. 693,096.

In accordance with the present invention, in a catalytic device of this nature, the catalyst is embodied in a capsule which is accommodated or adapted for being accommodated in the liquid-free cavity at the top of the cell, where it may float on the electrolyte, rest on the plates or be attached to part of the cell, the encapsulement being composed, wholly or in part, of a material which is non-porous to liquids but permeable to gases and vapours. In particular, in the cell, this material resists the entry of electrolyte, but permits access of hydrogen and oxygen to the catalyst and emergence of the water vapour or steam produced by their combination. Such a device can be made very simple and inexpensive, while with it the cell itself can be completely sealed.

Various ways of carrying the invention into effect will now be more fully described by way of example and with reference to the accompanying diagrammatic drawing, in which each of FIGURES 1 to 5 is a cross section through a capsule.

Figure 1:
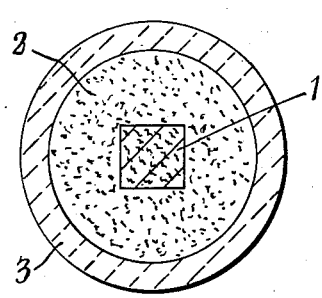

The capsule illustrated in FIGURE 1 is of spherical shape and consists of a core 1 of catalyst compound surrounded by a layer 2 of hydroscopic and anticorrosive compound and an encapsulement 3. The core 1 may, for example, comprise pellets of palladium on a carrier such as alumina. The layer 2 may, for example comprise lead dioxide with alumina. The active part of the device may thus be constituted similarly to the device of the aforesaid specification. The encapsulement 3 is made of a porous glass or ceramic material whose pore size is made such, preferably within the range 70–100 microns, that it will resist the entry of electrolyte but will permit of the entry of hydrogen and oxygen and the emergence of steam or water vapour formed from the said gases. It is understood that in the use of ceramic in the claims, this also includes glass.

The whole capsule may be coated or impregnated with a water-repellent substance such as a silicone.

The capsule may be made of a shape other than spherical and may, for instance, be square or rectangular in cross section or cylindrical. Its shape and size will in any case be made such that it can be accommodated within the normal air cavity above the electrolyte in the cell in which it is used.

Figure 2:
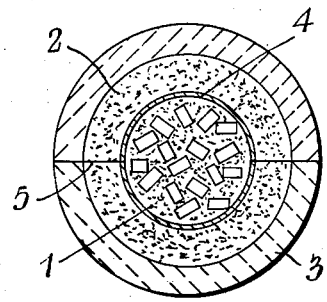

In FIGURE 2, the core 1 is shown separated from the layer 2 by a porous diaphragm 4 of, for example asbestos or glass cloth. The layers 2 and 3 of the capsule are made in two halves stuck together at the diametrical plane 5.

Figure 3:
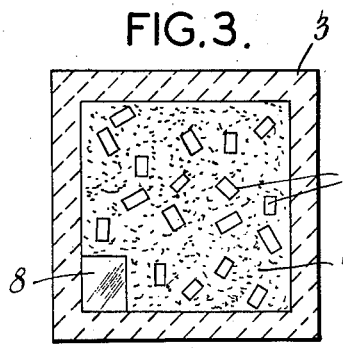

FIGURE 3 illustrates an example of a cubical capsule. In this example, moreover, there is no definite separation of core and intermediate layer. Pellets 6 of palladium on a carrier are interspersed in lead dioxide mixed with alumina 7. A piece 8 of non-porous glass or other non-porous material is provided within the capsule to act as a collecting point for water vapour when the capsule is cooling.

Figure 4:
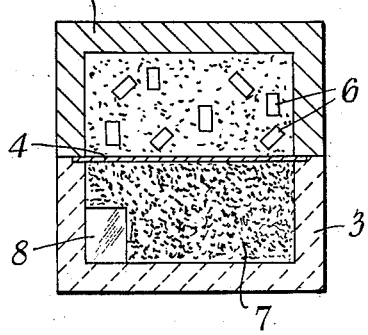

In FIGURE 4, only one half 3 of the encapsulement is porous, the other half being a non-porous lid 9. The porous half 3 containing the lead oxide with alumina 7 is separated from the non-porous half containing the palladium pellets 6 by a porous diaphragm 4 of, for example, asbestos or glass cloth or porous ceramic material. A water collector 8 is again provided.

Figure 5:
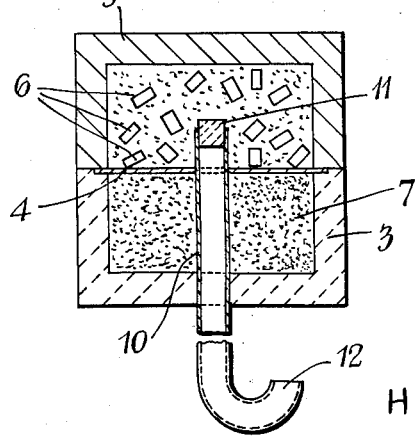

In FIGURE 5, a capsule similar to that shown in FIGURE 4, but without the water collector 8, is provided with a tube 10 closed at its upper end by a plug 11 of porous material and formed at its lower end with a U-bond 12. The upper end of the tube may extend into the upper half of the capsule, as shown, or may be carried to the bottom of the capsule only. The electrolyte or condensed steam or water vapour creates in the bend 12 a trap which prevents gases from rising in the tube 10 and permits only steam or water vapour to condense in the said tube.

Any of these capsules may be designed to float on the electrolyte with part or all of the body of the capsule always above the surface. For this purpose, it may be provided with any addition to render it buoyant, for example a buoyant base or floats in the form of beads of glass or other non-corrosive material fused or stuck to the capsule at intervals.

Alternatively the capsule may be adapted for resting on the top edges of the plates of the cell. For instance, the capsule may be provided with legs or projections which stand on the plates and support it above the electrolyte. The tube 10 in FIGURE 5 may serve as such a leg. The legs or projections may be arranged so that the capsule is held above the electrolyte whichever way up it may be.

It is also possible for the capsule to be stuck or fastened to some part of the cell in a position in the liquid-free cavity above the electrolyte. Thus the capsule may be provided with fastening means by which it can be secured to part of one of the posts, passing through the cavity, which form the conductors connected to the plates of the cell, or to one of the walls or the ceiling of the said cavity. Alternatively the capsule may be secured by an adhesive resistant to electrolyte.

In the operation of the cell, whether during charging or discharging, the hydrogen and oxygen produced in the cell pass through the encapsulement 3 into contact with the catalyst, where they combine to form steam or water vapour which passes back through the encapsulement 3 into the cavity above the electrolyte where it condenses on the walls and is returned to the said electrolyte. The energy developed as heat on combination of the gases prevents condensation inside the capsule so that the materials in the capsule remain in a dry and clean state. The intermediate layer 2 or compound 7 prevents corrosion and inhibits poisoning of the catalyst by agents such as stibine gas.

Arrangements other than those illustrated may be employed. Thus the catalyst may be embedded in a gas-permeable material which is non-porous to electrolyte or a porous catalyst carrier may be coated with an electrolyte-resistant, but gas-permeable, coating, The invention can be used with cells of other than lead-acid type, for instance with cells of the nickel-iron, nickel cadmium, silver-zinc and other types.

I claim:
1. A catalytic device for use with an electrolytic cell having therein plates immersed in an electrolyte with an air space above the plates and electrolyte, a capsule in the air space, a catalyst within the capsule, the capsule being composed of a ceramic material having a pore size such that the passage of liquid is resisted but the passage of oxygen and hydrogen and of steam and water vapor is permitted, the ceramic material being treated with a water repellent substance.

2. A catalytic device as claimed in claim 1 and consisting of a core of catalytic compound enclosed within a layer of hydroscopic anti-corrosive compound which is enclosed in turn within the encapsulement.

3. A catalytic device as claimed in claim 1, wherein the whole capsule is treated with a silicone water-repellent substance.

4. A catalytic device as claimed in claim 1, wherein the catalyst is enclosed by, but separated from a hydroscopic anti-corrosive material, by a porous diaphragm.

5. A catalytic device as claimed in claim 1, wherein the capsule contains a water collector consisting of a piece of non-porous material.

6. A catalytic device as claimed in claim 1, wherein a tube extending into the capsule has a porous plug in its inner end and a U-bend forming a trap at its outer end.

7. A catalytic device as claimed in claim 1, wherein the capsule has attached to it a device giving it buoyancy, so that it will float above the electrolyte.

8. A catalytic device as claimed in claim 1, wherein the capsule is provided with legs by which it can stand on the plates above the level of the electrolyte.

9. A catalytic device as claimed in claim 1 wherein the capsule is provided with means for its attachment to part of the cell above the electrolyte.

References Cited in the file of this patent

UNITED STATES PATENTS

| 1,452,806 | Hopkins | Apr. 24, 1923 |
| 2,687,448 | Gulick et al. | Aug. 24, 1954 |

FOREIGN PATENTS

| 5,816 | Great Britain | of 1889 |
| 693,096 | Great Britain | June 24, 1953 |